United States Patent [19]
Hirai et al.

[11] Patent Number: 6,132,610
[45] Date of Patent: Oct. 17, 2000

[54] ENDOTOXIN ADSORPTION SYSTEM

[75] Inventors: Fumiyasu Hirai, Amagasaki; Eiji Ogino; Takashi Asahi, both of Kobe; Nobutaka Tani, Osaka, all of Japan

[73] Assignee: Kaneka Corporation, Osaka, Japan

[21] Appl. No.: 08/905,710

[22] Filed: Aug. 5, 1997

[30] Foreign Application Priority Data

Sep. 19, 1996 [JP] Japan ..................... 8-248311

[51] Int. Cl.$^7$ ............ B01J 47/00; B01J 47/02; B01J 47/04
[52] U.S. Cl. .......... 210/264; 210/283; 210/284; 210/290; 521/28; 525/191; 525/201
[58] Field of Search .................. 525/191, 201; 521/28; 210/290, 264, 283, 284

[56] References Cited

U.S. PATENT DOCUMENTS

| | | | |
|---|---|---|---|
| 1,873,305 | 8/1932 | De Ville | 210/290 |
| 2,666,741 | 1/1954 | McMullen | 210/290 |
| 3,382,169 | 5/1968 | Thompson | 210/290 |
| 3,617,558 | 11/1971 | Jones | 210/290 |
| 4,209,392 | 6/1980 | Wallace . | |
| 4,305,826 | 12/1981 | Moses | 210/290 |
| 5,403,917 | 4/1995 | Boos et al. . | |

FOREIGN PATENT DOCUMENTS

| | | |
|---|---|---|
| 31 10128 | 9/1982 | Germany . |
| 1-16389 | 3/1989 | Japan . |
| 3-35974 | 5/1991 | Japan . |
| 04322660 | 11/1992 | Japan . |
| 4-322660 | 11/1992 | Japan . |
| 6-211900 | 8/1994 | Japan . |
| 8-173803 | 7/1996 | Japan . |
| 724003 | 2/1955 | United Kingdom . |

OTHER PUBLICATIONS

Kurrary Co. Ltd., WPIDS AN 92–427658, Nov. 1992.
Juggi et al., Indian Journal of Physiology and Pharmacology, 17(4), p. 323–33, 1973.
Juggi, Proceed. of the Soc. for Experimental Biol. and Med. 137(1) pp. 39–42, 1971.
Australian and New Zealand Journal of Surgery, 41(2), 194–201, 1971.

*Primary Examiner*—Jeffrey C. Mullis
*Attorney, Agent, or Firm*—Fish & Neave; James F. Haley; Karen Mangasarian

[57] ABSTRACT

An endotoxin adsorption system of the present invention comprises a combination of a cation exchange resin having sodium as a counter ion and a cation exchange resin having sodium and one or more metal ions other than sodium as a counter ion, and adsorbs an endotoxin without decreasing of the concentration of cations.

8 Claims, No Drawings

ENDOTOXIN ADSORPTION SYSTEM

BACKGROUND OF THE INVENTION

1. Field of the Invention

The present invention relates to an endotoxin adsorption system, a method for adsorbing endotoxin using an endotoxin system, and an endotoxin adsorber including the system.

2. Description of the Prior Art

One of the most numerous and dominant agents causing inflammation from bacterial infection is endotoxin which is present on the surface of Gram-negative bacteria. Due to the effect of endotoxin, production of various cytokines and activated complements are promoted.

For example, in septicemia, endotoxin is produced by a bacterial infection, resulting in systemic inflammation. When inflammation proceeds, a shock symptom (septic shock) is caused, which may result in an organic disorder (organic deficiency) and a critical condition such as a multi-organic deficiency.

Examples of therapeutic methods for septicemia include administration of antibiotics for preventing the infection, administration of γ-globulin for activating resistance to the infection, and the like. Irrespective of these therapeutic methods, septicemia still shows a high death rate. Therefore, it is desirable from a medical point of view that the endotoxin causing the septicemia is removed from a body fluid.

It is known to use an adsorbent for the purpose of removing endotoxin. For example, Japanese Patent Publication No. 1-16389 discloses a material in which polymyxin known as an antidote for endotoxin is immobilized onto an appropriate carrier. Japanese Patent Publication No. 3-35974 discloses an adsorbent in which basic nitrogen functional groups and polymyxin are bound to a vinyl polymer. This adsorbent decomposes endotoxin with polymyxin and allows the decomposed product to adsorb to the nitrogen functional group. However, some steps are required for preparing such adsorbent and polymyxin used as an antidote is very expensive. Japanese Laid-Open Patent Publication No. 6-211900 discloses an adsorption material in which a polyanion polymer is bound to a carrier (e.g., porous glass, silica gel coated with a porous organic polymer, and cross-linked carbohydrate) having appropriate pore diameter and molecule excluding range. However, the effect of this adsorption material to adsorb endotoxin is small. The inventors of the present invention disclose in Japanese Laid-Open Patent Publication No. 8-173803 that a styrene-divinylbenzene copolymer with a sulfo group introduced thereto is effective as an appropriate carrier for removing endotoxin. However, in the case where this carrier is utilized for actual treatment in extracorporal circulation under the condition that the carrier having sodium as a counter ion is used alone, there is a possibility that the carrier not only removes endotoxin from a body fluid but also decreases the concentration of cations other than sodium. Thus, further improvement has been desired.

SUMMARY OF THE INVENTION

The object of the present invention is to remove endotoxin selectively from a body fluid, in particular, blood, plasma, and serum without decreasing the concentration of cations in the body fluid.

In order to solve the above-mentioned problems, the inventors of the present invention found that an endotoxin adsorption system comprising a combination of a cation exchange resin having sodium as a counter ion and a cation exchange resin having sodium and one or more metal ions other than sodium as a counter ion was effective. The present invention has been achieved based on such findings. More specifically, endotoxin is selectively adsorbed from a body fluid with the cation exchange resin having sodium as a counter ion and cations are supplemented by the cation exchange resin having one or more metal ions other than sodium as a counter ion, whereby the concentration of cations in the body fluid is prevented from decreasing.

The present invention provides an endotoxin adsorption system comprising a combination of a cation exchange resin having sodium as a counter ion and a cation exchange resin having sodium and one or more metal ions other than sodium as a counter ion.

In a preferred embodiment, the one or more metal ions other than sodium is at least one metal ion selected from the group consisting of calcium, magnesium, and potassium.

In a preferred embodiment, the one or more metal ions other than sodium is calcium.

In a preferred embodiment, the cation exchange resin is a styrene-divinylbenzene copolymer with a sulfo group introduced thereto.

In a preferred embodiment, an ion exchange volume of the styrene-divinylbenzene copolymer with a sulfo group introduced thereto is in a range of 0.01 meq/ml to 5 meq/ml.

The present invention provides a method for adsorbing endotoxin comprising the step of contacting an endotoxin adsorption system comprising a combination of a cation exchange resin having sodium as a counter ion and a cation exchange resin having sodium and one or more metal ions other than sodium as a counter ion with a body fluid containing endotoxin.

Furthermore, the present invention provides an endotoxin adsorber comprising a container having an inlet and an outlet for liquid in which the endotoxin adsorption system is contained.

In a preferred embodiment, the container is equipped with a device for preventing the endotoxin adsorption system from flowing out the container.

Thus, the invention described herein makes possible the advantages of (1) providing an endotoxin adsorption system which selectively adsorbs endotoxin from body fluid, in particular, blood, plasma, and serum without decreasing the concentration of cations in the body fluid; (2) providing a method for adsorbing endotoxin using the endotoxin adsorption system; and (3) an endotoxin adsorber including the endotoxin adsorption system.

These and other advantages of the present invention will become apparent to those skilled in the art upon reading and understanding the following detailed description.

DESCRIPTION OF THE PREFERRED EMBODIMENTS

"A body fluid" as used herein refers to blood, plasma, serum, ascites, lymph, joint effusion, and fractions obtained therefrom, as well as other humoral components derived from organisms.

Endotoxin is also called liposaccharide or pyrogen. Endotoxin consists of a lipid site (which is called lipid A) and a polysaccharide site covalently bound to the lipid site via 2-keto-3-deoxyoctonic acid. An endotoxin activity appears to present in the lipid A sites.

"A cation exchange resin" as used herein refers to a solid substance having an anionic functional group, which is negatively charged in the vicinity of neutral pH. The anionic functional group includes a sulfo group, a sulfuric ester group, a carboxyl group, a phosphoric ester group, a silanol group, and a phenolic hydroxyl group, but is not limited thereto. These functional groups may be used alone or in combination with one or more groups. Preferred anionic functional groups include a sulfo group and a sulfuric ester group. As the cation exchange resin used in the present invention, a styrene-divinylbenzene copolymer with a sulfo group introduced thereto is particularly preferable, but the present invention is not limited thereto.

The form of the cation exchange resin used in the present invention includes particle, plate, film, and fiber, but is not limited thereto.

It is preferable that the cation exchange resin used in the present invention allows blood to pass therethrough. Specifically, it is preferable that the cation exchange resin is capable of forming interspaces through which cells contained in blood can sufficiently pass. For example, in case that a cation exchange resin is particle, fine powder form of the cation exchange resin is not preferable. The particle size of the cation exchange resin is required to be 200 $\mu$m or more. More specifically, a cation exchange resin in the form of particle is preferably used under the condition that particles which are too small and particles which are too big are removed (i.e., in a narrow range of particle size distribution). The average particle size of the cation exchange resin is preferably in a range of 200 $\mu$m to 1000 $\mu$m. In addition, in the case where a cation exchange resin is fibrous and hollow, the inner diameter of the cation exchange resin is preferably 5 $\mu$m or more. When the inner diameter of the cation exchange resin is less than 5 $\mu$m, there is a possibility that cells contained in a body fluid would not thoroughly pass through the cation exchange resin. In the case where a cation exchange resin is fibrous and dense, the diameter thereof is preferably 1 $\mu$m or more. When the diameter of the cation exchange resin is less than 1 $\mu$m, there is a possibility that cells contained in a body fluid are non-specifically adsorbed.

In order to prevent non-specific adsorption of blood cell components when passing blood through a cation exchange resin, the cation exchange resin can be coated with an appropriate polymer such as a hydroxyethyl methacrylate. This coating can also be utilized for preventing the generation of fine particles from the cation exchange resin.

In the present invention, there are various copolymerization methods for obtaining a styrene-divinylbenzene copolymer. Any method can be used. A typical method includes the steps of; adding an appropriate amount of divinylbenzene to styrene; adding a polymerization catalyst (e.g., a small amount of benzoyl peroxide and water) to the mixture; adding a suspension such as bentonite and alginic acid to the resulting mixture; and polymerizing the mixture with vigorous stirring.

In the present invention, a method for introducing a sulfo group into a styrene-divinylbenzene copolymer includes various methods such as treating the copolymer with concentrated sulfuric acid or chlorosulfonic acid. However, the method is not limited thereto.

The ion exchange volume of the cation exchange resin of the present invention is required to be appropriate for adsorbing endotoxin and supplementing cations. The ion exchange volume of the cation exchange resin of the present invention is preferably 0.01 to 5 meq/ml, and more preferably 0.1 to 2 meq/ml. When the ion exchange volume is less than 0.01 meq/ml, the ability of the cation exchange resin to adsorb endotoxin is decreased; therefore, this volume is not preferable. When the ion exchange volume is more than 5 meq/ml, it becomes difficult to prepare an adsorbent while maintaining the ability of adsorbing endotoxin. The ion exchange volume of the cation exchange resin having sodium as a counter ion and that of the cation exchange resin having sodium and one or more metal ions other than sodium as a counter ion may or may not be the same.

The cation exchange resin of the present invention is capable of adsorbing endotoxin only on its outer surface. However, in order to adsorb more endotoxin, it is preferable that the outer surface have as many pores as possible so that endotoxin may sufficiently enter inside therethrough. The pores distributed on the surface can be measured by a mercury impression method or a nitrogen adsorption method. In order to adsorb endotoxin, a cation exchange resin has a primary pore distribution preferably in a range of 50 to 2000 Å, and more preferably in a range of 100 to 1000 Å. The pore distribution of the cation exchange resin having sodium as a counter ion and that of the cation exchange resin having sodium and one or more metal ion as a counter ion may or may not be the same.

The cation exchange resin of the present invention is capable of adsorbing endotoxin only on its outer surface. However, in order to adsorb more endotoxin, an inner surface area capable of being used for adsorption per one unit of cation exchange resin (specific surface area) is preferably large. The specific surface area is preferably 10 $m^2/g$ or more, and more preferably 100 $m^2/g$ or more. The specific surface area of the cation exchange resin having sodium as a counter ion and that of the cation exchange resin having sodium and one or more metal ions other than sodium as a counter ion may or may not be the same.

The cation exchange resin having sodium as a counter ion of the present invention can be obtained by treating a cation exchange resin with an aqueous solution containing sodium, such as a sodium hydroxide aqueous solution or a sodium chloride aqueous solution. It is preferable that all the counter ions are sodium; however, a slightly portion of the counter ions may be hydrogen ions or other cations.

The cation exchange resin having sodium and one or more metal ions other than sodium as a counter ion of the present invention can be obtained by (1) a method for treating a cation exchange resin with an aqueous solution containing sodium and one or more metal ions other than sodium or (2) a method for treating a cation exchange resin including sodium as a counter ion with an aqueous solution containing one or more metal ions other than sodium. However, the method is not limited thereto. According to the method (1), the cation exchange resin of the present invention is obtained from a cation exchange resin treated with an aqueous solution, for example, containing sodium chloride and at least one of calcium chloride, magnesium chloride, and potassium chloride. According to the method (2), the cation exchange resin of the present invention is obtained from a cation exchange resin having sodium as counter ions treated with an aqueous solution, for example, containing at least one of calcium chloride, magnesium chloride, and potassium chloride.

A container for loading the cation exchange resin having sodium as a counter ion and/or the cation exchange resin having sodium and one or more metal ions other than sodium as a counter ion may be provided with an inlet and an outlet for body fluid. The container may possess a filter at the outlet, which passes a body fluid not the resin loaded. This container can be incorporated into an extracorporal circulation circuit, whereby endotoxin can be efficiently removed from a body fluid of a patient on line.

The endotoxin adsorption system of the present invention refers to a system that selectively removes endotoxin from a body fluid with a cation exchange resin having sodium as a counter ion and supplements with cations by a cation exchange resin having sodium and one or more metal ions other than sodium as a counter ion. More specifically, the endotoxin adsorption system of the present invention is the system that utilizes a combination of a cation exchange resin having sodium as a counter ion and a cation exchange resin having sodium and one or more metal ions other than sodium as a counter ion.

In the endotoxin adsorption system of the present invention, each of the above-mentioned cation exchange resins can be loaded into separate containers and then the containers can be connected in series. In this case, the container loaded with the cation exchange resin having sodium as a counter ion is positioned at an upstream side and the container loaded with the cation exchange resin having sodium and one or more metal ions other than sodium is positioned at a downstream side, whereby endotoxin can be adsorbed at the upstream side and cations can be supplemented at the downstream side when a body fluid containing endotoxin is passed through the system.

Alternatively, in the endotoxin adsorption system of the present invention, each of the above-mentioned cation exchange resins can be loaded into one container in a multi-layered manner. In this case, the cation exchange resin having sodium as a counter ion is loaded at an upstream side of the container and the cation exchange resin having sodium and one or more metal ions other than sodium is loaded at a downstream side of the container, whereby endotoxin can be adsorbed at the upstream side and cations can be supplemented at the downstream side when a body fluid containing endotoxin is flown through the system.

Alternatively, the above-mentioned cation exchange resins can be mixed with and loaded into one container.

Hereinafter, the present invention will be described in more detail by way of illustrative examples. It is noted that the present invention is not limited to the following examples.

EXAMPLE

Example 1

A cation exchange resin, DIAION® HPK55H (produced by Mitsubishi Chemical Industries Ltd.) was treated with sodium hydroxide, whereby a counter ion was changed to sodium. Thereafter, the cation exchange resin was washed with distilled water and loaded into each of two columns in an amount of 1 ml. One of the columns was washed with physiological saline (Column A). The other column was washed with distilled water after 0.5 ml of 0.375 M calcium chloride aqueous solution was passed through the column. Thus, a column having sodium and calcium as counter ions was produced (Column B). Column A and Column B were connected in such a manner that Column A was positioned at an upstream side and Column B was positioned at a downstream side. A human serum containing about 5 ng/ml of endotoxin and having a calcium concentration of about 10 mg/dl was passed through these columns from the inlet of Column A at a flow rate of 0.5 ml/minute. After 4 ml of an initial effluence was discarded, 2 ml of an effluence was collected from the outlet of Column B. The sample was treated with fresh perchloric acid. Thereafter, the concentration of endotoxin was measured by a chromogenic substrate method, Limulus test (Seikagaku Kogyo Co., Ltd.). The concentration of calcium was also measured by an OCPC method (Wako Pure Chemical Industries, Ltd.).

Comparative Example 1

A cation exchange resin, DIAION® HPK55H (produced by Mitsubishi Chemical Industries Ltd.) was treated with sodium hydroxide, whereby a counter ion was changed to sodium. Thereafter, the cation exchange resin was washed with distilled water. One milliliter of the resulting cation exchange resin was loaded into a column. The column was washed with physiological saline. A human serum containing about 5 ng/ml of endotoxin and having a calcium concentration of about 10 mg/dl was passed through the column from an inlet thereof at a flow rate of 0.5 ml/minute. After 4 ml of an initial effluence was discarded, 2 ml of an effluence was collected from an outlet of the column. The concentrations of endotoxin and calcium were measured in the same way as in Example 1.

Result

| | Concentration of endotoxin at outlet of column | Concentration of calcium at outlet of column |
|---|---|---|
| Example 1 | 0.4 ng/ml | 9.5 mg/dl |
| Comparative Example 1 | 1.1 ng/ml | 0.5 mg/dl |

In both Example 1 and Comparative Example. 1, the concentration of endotoxin at the outlet of the column was greatly decreased, compared with the initial concentration (about 5 ng/ml) of endotoxin before the serum was passed through the column. Thus, it was found that endotoxin in a body fluid can be efficiently removed by adsorption. The concentration of calcium was greatly decreased in Comparative Example 1, while the initial concentration of calcium before the serum was passed through the column was maintained in Example 1.

Example 2

A cation exchange resin, DIAION® RCP160M (produced by Mitsubishi Chemical Industries Ltd.) was treated with sodium hydroxide, whereby a counter ion was changed to sodium. Thereafter, the cation exchange resin was washed with distilled water. The cation exchange resin was loaded into each of two columns in an amount of 1 ml. One of the columns was washed with physiological saline (Column A). The other column was washed with distilled water after 0.5 ml of an aqueous solution containing 0.375 M calcium chloride and 0.15 M magnesium chloride was passed through the column. Thus, a column having sodium, calcium, and magnesium as counter ions was produced (Column B). Column A and Column B were connected in such a manner that Column A was positioned at an upstream side and Column B was positioned at a downstream side. A human serum containing about 5 ng/ml of endotoxin and having a calcium concentration of about 10 mg/dl and a magnesium concentration of about 2 mg/dl was passed through these columns from the inlet of Column A at a flow rate of 0.5 ml/minute. After 4 ml of an initial effluence was discarded, 2 ml of an effluence was collected from the outlet of Column B. The sample was treated with fresh perchloric acid and then the concentration of endotoxin was measured by a chromogenic substrate method, Limulus test (Seikagaku Kogyo Co., Ltd.). Furthermore, the concentration of calcium was measured by an OCPC method (Wako Pure Chemical Industries, Ltd.), and the concentration of magnesium was measured by a Xylidil-Blue method (Wako Pure Chemical Industries, Ltd.).

Comparative Example 2

A cation exchange resin, DIAION® RCP160M (produced by Mitsubishi Chemical Industries Ltd.) was treated with sodium hydroxide, whereby a counter ion were changed to sodium. Thereafter, the cation exchange resin was washed with distilled water. One milliliter of the resulting cation exchange resin was loaded into a column. The column was washed with physiological saline. A human serum containing about 5 ng/ml of endotoxin and having a calcium concentration of about 10 mg/dl and a magnesium concentration of about 2 mg/dl was passed through the column from the inlet thereof at a flow rate of 0.5 ml/minute. After 4 ml of an initial effluence was discarded, 2 ml of an effluence was collected from the outlet of the column. The concentrations of endotoxin, calcium, and magnesium were measured in the same way as in Example 2.

Result

|  | Concentration of endotoxin at outlet of column | Concentration of calcium at outlet of column | Concentration of magnesium at outlet of column |
| --- | --- | --- | --- |
| Example 2 | 2.1 ng/ml | 9.3 mg/dl | 1.9 mg/dl |
| Comparative Example 2 | 2.0 ng/ml | 0.4 mg/dl | 0.2 mg/dl |

In both Example 2 and Comparative Example 2, the concentration of endotoxin at the outlet of the column was greatly decreased, compared with the initial concentration (about 5 ng/ml) of endotoxin before the serum was passed through the column. Therefore, it was found that endotoxin in a body fluid can be efficiently removed by adsorption. The concentrations of calcium and magnesium were greatly decreased in Comparative Example 2, while the concentrations of calcium and magnesium before the serum was passed through the column were maintained in Example 2.

The endotoxin adsorption system of the present invention, i.e., a system comprising a combination of a cation exchange resin having sodium as a counter ion and a cation exchange resin having sodium and one or more metal ions other than sodium enables endotoxin to be adsorbed without decreasing the concentration of cations in a body fluid. Thus, according to the present invention, a method for preventing the problems associated with endotoxin in various diseases caused by endotoxin can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An endotoxin adsorption system comprising a combination of a first cation exchange resin having sodium as a counter ion and a second cation exchange resin having sodium and one or more metal ions other than sodium as a counter ion, wherein the system further comprises a container for loading the cation exchange resins, the container having an inlet and an outlet, and wherein the first cation exchange resin is positioned closer to the inlet than the second cation exchange resin, wherein the system, when in use, does not result in a decrease in the concentration of cations other than sodium in a body fluid passing through the cation exchange resins.

2. The endotoxin adsorption system according to claim 1, wherein said one or more metal ions other than sodium is at least one metal ion selected from the group consisting of calcium, magnesium, and potassium.

3. The endotoxin adsorption system according to claim 1, wherein said one or more metal ions other than sodium is calcium.

4. The endotoxin adsorption system according to claim 1, wherein said cation exchange resin is a styrene-divinylbenzene copolymer with a sulfo group introduced thereto.

5. The endotoxin adsorption system according to claim 4, wherein an ion exchange volume of said styrene-divinylbenzene copolymer with a sulfo group introduced thereto is in a range of 0.01 meq/ml to 5 meq/ml.

6. An endotoxin adsorption system according to claim 1, wherein the first cation exchange resin adsorbs endotoxin, and the second cation exchange resin supplements said one or more metal ions other than sodium.

7. An endotoxin adsorber comprising a first container and a second container having an inlet and an outlet for liquid, wherein the first container contains a cation exchange resin having sodium as a counter ion and the second container contains a second cation exchange resin having sodium and one or more metal ions other than sodium as a counter ion, and the first container is positioned closer to the inlet than the second container, and wherein the system, when in use, does not result in a decrease in the concentration of cations other than sodium in a body fluid passing through the cation exchange resins.

8. The endotoxin adsorber according to claim 7, wherein said container is equipped with a device for preventing the endotoxin adsorption system from flowing out the container.

* * * * *